United States Patent [19]

Masui et al.

[11] Patent Number: 4,873,041

[45] Date of Patent: Oct. 10, 1989

[54] PROCESS FOR PRODUCING A MULTILAYER MOLDED ARTICLE

[75] Inventors: Syohei Masui, Kyoto; Masahito Matsumoto, Ibaraki; Nobuhiro Usui, Takatsuki, all of Japan

[73] Assignee: Sumitomo Chemical Company, Limited, Osaka, Japan

[21] Appl. No.: 238,857

[22] Filed: Aug. 31, 1988

[30] Foreign Application Priority Data

Aug. 31, 1987 [JP] Japan .................................. 62-218457
Aug. 31, 1987 [JP] Japan .................................. 62-218458

[51] Int. Cl.⁴ ..................... B29C 43/04; B29C 43/18; B29C 43/20; B32C 27/00
[52] U.S. Cl. .................................... 264/135; 264/130; 264/136; 264/257; 264/266
[58] Field of Search ............... 264/135, 136, 257, 266, 264/130, 511

[56] References Cited

U.S. PATENT DOCUMENTS 2,509,499  5/1950  Higgins ............................... 264/134
2,847,712  8/1958  Pollard et al. ....................... 264/259

FOREIGN PATENT DOCUMENTS 1137713  6/1986  Japan ................................. 264/259

Primary Examiner—Jan H. Silbaugh
Assistant Examiner—Kelley M. Sidwell
Attorney, Agent, or Firm—Birch, Stewart, Kolasch & Birch

[57] ABSTRACT

A multilayer molded article having improved appearance and feeling is produced by wetting a skin material including a fabric or a thermoplastic resin sheet as an outermost layer with at least one liquid material which is water, an aqueous solution, a volatile material which is liquid in an ordinary state, or a solution including the volatile material as a medium, supplying the wet skin material between male and female molds, supplying a thermoplastic resin melt between the molds and closing the molds to form the multilayer molded article including the integrally adhered skin material and the thermoplastic resin.

6 Claims, 1 Drawing Sheet

FIG. 1
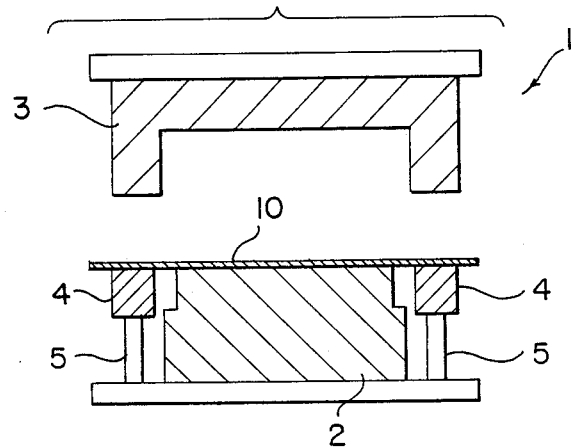
FIG. 2  A10
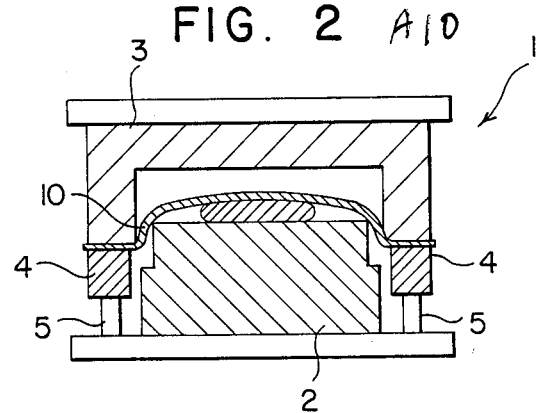
FIG. 3
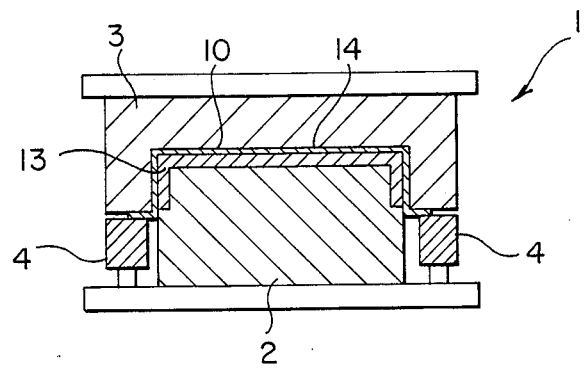

PROCESS FOR PRODUCING A MULTILAYER MOLDED ARTICLE

BACKGROUND OF THE INVENTION

1. Field of the Invention

The present invention relates to a process for producing a multilayer molded article. More particularly, the present invention relates to a process for producing a multilayer molded article comprising a thermoplastic resin and a skin material having good appearance, which is used as an automobile interior material and a part of an electric equipment.

2. Description of the Related Art

Hitherto, molded articles on which a skin material is laminated to improve their beauty, softness and the like so as to make their grade higher were widely used.

To produce such molded articles having the skin material, there is a process known which comprises molding a thermoplastic resin by one of the conventional molding methods such as injection molding and then molding the skin material onto the molded article by vacuum molding and the like or simultaneously molding the thermoplastic resin and the skin material wherein the skin material is adhered to the molded resin with an adhesive to laminate the skin material onto the molded resin.

Another known process comprises placing the skin material in a mold, closing the mold and then injecting the hot thermoplastic resin melt through a gate into the mold to laminate the resin onto the skin material, cooling the mold and removing the multilayer molded article is also known.

A further known process comprises placing the skin material between the upper and lower molds, supplying the thermoplastic resin melt while the molds are unclosed, closing the molds to integrate the thermoplastic resin and the skin layer together.

However, each of the conventional processes has its respective drawbacks.

Since the first process uses the adhesive to laminate the molded resin and the skin material, the steps become complicated and in turn a production cost of the molded article becomes high, and a solvent or a dispersant contained in the adhesive will pollute the environment.

In the second process, since the resin melt which is pressurized at a high temperature is injected into the mold, so that the resin melt contacts and presses the skin material strongly against the mold wall, the surface of the skin material is discolored, a pattern of the skin material is deformed or the appearance of a fabric with raising is deteriorated, due to flatting or flowing of the raising. Further, in some cases, the resin melt impregnates or penetrates into the skin material so that the commercial value of the molded article is impaired.

The drawbacks of the second process can be overcome by the third process to some extent so that, according to a type of skin material (a kind, quality, etc.), a good multilayer molded article can be obtained. However, the quality of the molded article is still unsatisfactory.

To overcome the above described drawbacks or to prevent deterioration of the softness of a skin material, it was proposed to interpose a plastic foam between the skin material and the thermoplastic resin or to use a packing material such as paper or a dense plastic foam as a heat insulator or a resin barrier (cf. Japanese Patent Kokai Publication Nos. 212343/1985 and 29436/1982).

When the plastic foam alone is interposed between the skin material and the thermoplastic resin, the cells of the foam are broken by heat and pressure from the resin melt, whereby distinct uneveness is formed on a surface of the foam which contacts the skin material and the unevenness is transferred to the surface of the skin material so that not only the appearance, but also the feeling of the molded article are impaired. When the packing material which has stiffness and comparatively small elongation such as paper or dense plastic foam is interposed between the skin material and the thermoplastic resin, it may be partially broken or warp in the case of a molded article having a complicated shape, whereby the appearance of the article is impaired.

Further, it was proposed to use a skin material having a protective layer made of the same plastic as the thermoplastic resin of the article (cf. Japanese Patent Kokai Publication Nos. 71161/1979, 109759/1981 and 109760/1981). It was also proposed to use a skin material on a back surface of which a foam layer is adhered or welded and a packing material (cf. Japanese Patent Kokai Publication No. 212342/1985).

It is possible to maintain the appearance (or feeling) of the skin material to some extent by these methods, but further improvement is desired.

SUMMARY OF THE INVENTION

An object of the present invention is to provide a process for producing a multilayer molded article which highly maintains the appearance (feeling) and has a skin material comprising a fabric or a thermoplastic resin sheet as the outermost layer.

According to the present invention, there is provided a process for producing a multilayer molded article which comprises the steps of wetting a skin material comprising a fabric or a thermoplastic resin sheet as the outermost layer with at least one liquid material selected from the group consisting of water, an aqueous solution, a volatile material which is liquid in an ordinary state and a solution comprising said volatile material as a medium, supplying the wet skin material between male and female molds, supplying a thermoplastic resin melt between the molds and closing the molds to form the multilayer molded article comprising the integrally adhered skin material and the thermoplastic resin.

When the skin material comprises the outermost layer of the fabric, it is preferably wetted with an aqueous solution of a surfactant, particularly a cationic surfactant.

BRIEF DESCRIPTION OF THE DRAWINGS

FIGS. 1, 2 and 3 schematically show vertical cross sections of the molding apparatus of various stages in the process of the present invention.

DETAILED DESCRIPTION OF THE INVENTION

The skin material comprising the fabric as the outermost layer includes a single piece of a woven fabric or non woven fabric which may be optionally lined with a packing agent, a laminate of such woven or nonwoven fabric with a plastic film, a plastic foam, a composite sheet of a plastic film and a plastic foam or a cloth.

Examples of fibers which constitute said woven or nonwoven fabric are natural fibers (e.g., cotton, wool, silk and hemp) and synthetic fibers (e.g., polyamide and polyester). From a single or mixed yarn of these fibers, the woven fabrics such as plain weave, moquette and tricot, knitted webs and nonwoven fabrics formed by needle punching can be made by conventional methods.

The skin material comprising the fabric as the outermost layer loses its appearance or feeling due to heat, pressure and elongation, and the fabric may be broken at a corner of the molded article or the resin melt tends to ooze out through the fabric. Therefore, when the skin material and the thermoplastic resin melt are integrated in the mold, it is important to keep the temperature, pressure and elongation as low as possible in order to produce the multilayer molded article having good appearance and to prevent breakage of the fabric or oozing out of the thermoplastic resin melt. Further, it is advantageous to impart recovery properties to the fabric after release of the molded article from the mold.

The skin material comprising the thermoplastic resin sheet as the outermost layer includes a sheet which is prepared by molding a resin (e.g. polyvinyl chloride resin, vinyl chloride base copolymers, polymer blends comprising polyvinyl chloride, polyolefin base thermoplastic elastomer, styrene base thermoplastic elastomer, etc.) or a resinous composition comprising at least one of such resins and suitable additives such as a thermoplastic resin stabilizer and a plasticizer and pigments by calendering, extrusion, etc. and which generally has various patterns on its surface and is optionally lined by one or more layers of fabrics, other thermoplastic resin sheets, films or thermoplastic resin foam sheets.

The skin material comprising the thermoplastic resin sheet as the outermost layer loses its appearance or feeling due to heat, pressure and elongation and may be broken at corners of the molded article. Therefore, when the skin material and the thermoplastic resin melt are integrated in the mold, it is important to keep the temperature, pressure and elongation as low as possible in order to produce the multilayer molded article having good appearance and to prevent breakage of the thermoplastic resin sheet or oozing out of the thermoplastic resin melt.

According to the present invention, before the supplying the resin melt between the molds, the skin material comprising the fabric or the thermoplastic resin sheet as the outermost layer is wetted with at least one liquid material selected from the group consisting of water, an aqueous solution, a volatile material which is liquid in an ordinary state (at room temperature under atmospheric pressure) and a solution comprising said volatile material as a medium (hereinafter referred to as "liquid material"). Thereby, when the skin material comprises the fabric as the outermost layer, the appearance (feeling) of the fabric is maintained, and breakage of the fabric or oozing out of the resin melt at the corner of the molded article and warp of the molded article are effectively prevented. When the skin material comprises the thermoplastic resin sheet as the outermost layer, collapse of the surface pattern on the thermoplastic resin sheet is prevented, and maintenance of the feeling is improved. Further, discoloration or partial elongation of the thermoplastic resin sheet is prevented so that the breakage of the sheet at the corner of the molded article is prevented. As the liquid material, a solution comprising a surfactant, preferably a cationic surfactant is preferred because of better effects.

The reason why the above described effects are achieved by the present invention has not been made clear but may be assumed as follows:

In the case of the skin material having the fabric outermost layer, the outermost layer is wetted with the liquid material an, increase of the temperature of the skin material, particularly at the fabric side, is prevented when the thermoplastic resin melt contacts the fabric or the lining so that not only is the flatting or flowing of the raising prevented but also the elongation is suppressed so that the breakage at the corner is prevented. Further, the presence of the liquid material prevents penetration of the resin melt in the fabric layer and oozing out of the resin melt onto the surface side. Moderate penetration of the resin melt in the fabric layer bonds the resin and the skin material by an anchoring effect. However, in the case of excess penetration of the resin melt in the fabric layer, the feeling is deteriorated, and further the skin material prevents shrinkage of the resin at the skin material side which causes warping of the molded article. In addition, during the evaporation of the liquid material the, falling of the raising is partly recovered so that the maintenance of the feeling is improved. When the solution comprising the cationic surfactant is used as the liquid material, this recovery effect is enhanced by the action of the cationic surfactant.

The above explanation can be applied to the case where the skin material having the outermost layer of the thermoplastic resin sheet is used, and the effects of the present invention may be achieved by the prevention of temperature rise of the skin material, particularly at the outermost surface layer side, when the thermoplastic resin melt contacts the fabric or the lining. When the skin material having the outermost layer of the thermoplastic resin sheet has, on its back surface, the fabric layer or the thermoplastic resin foam layer, and said back surface layer and the thermoplastic resin of the molded article are adhered by the anchor effect, it is necessary for the thermoplastic resin melt to penetrate into the back surface layer to some extent. However, excess penetration of the thermoplastic resin melt into the skin material deteriorates the feeling and causes warping of the molded article. According to the present invention, since the back surface of the skin material is wetted with the liquid material, the penetration of the thermoplastic resin melt is controlled and warping of the molded article is prevented. Further, when the thermoplastic resin foam constitutes the back surface layer or an intermediated layer of the skin material, it prevents temperature rise so that the collapse of the foam and deterioration of the feeling due to secondary foaming are prevented.

As the thermoplastic resin of the molded article, any one of the thermoplastic resins which are conventionally used in press molding, injection molding and extrusion molding can be used. Specific examples of the thermoplastic resin are polyethylene, polypropylene, copolymers of ethylene or propylene, ABS resins, styrene base resins, polyamide resins, polyester resins, polymer alloys and mixtures thereof. The thermoplastic resin may contain fillers (e.g. inorganic fillers and glass fibers), pigments, foaming agents, lubricants, antistatic agents and the like.

The liquid material is a material which is liquid in an ordinary state and has a suitable volatility. Examples of the liquid material are water, alcohols, hydrocarbons and ketones. They may be diluted or mixed or may contain a surfactant. In case of the skin material having the fabric outermost layer, an aqueous solution containing the cationic surfactant such as a tertiary amine is preferred.

The wetting manner is not critical in the present invention. Preferably the liquid material is sprayed on the skin material on the fabric or thermoplastic resin sheet side, although it can be sprayed on the back surface or the both surface of the skin material. A wetness of the skin material depends on the type of skin material. when the back surface of the skin material is to wet, undesirably decreases in adhesivity will occur between the skin material and the thermoplastic resin.

The present invention will be explained by making reference to the accompanying drawings. In FIGS. 1, 2 and 3, numeral 1 stands for a molding apparatus, 2 stands for a male mold, 3 stands for a female mold, 4 stands for a flame for supporting the skin material, 5 stands for a stretching mechanism and 10 stands for a skin material having the fabric or the thermoplastic resin sheet as the outermost layer. The skin material is wetted before the supply of the thermoplastic resin melt. 11 stands for a resin melt and 14 stands for a multilayer molded article. The process of the present invention is carried out by using this apparatus as follows:

1) By means of a spray gun containing the liquid material, the liquid material is sprayed on the surface of the skin material on which the outermost layer of the fabric or the thermoplastic resin sheet is formed to wet the skin material adequately.

2) The wetted skin material is supplied on flame 4 continuously or in the form of a cut piece having a suitable size (FIG. 1).

3) Female mold 3 is lowered so as hold the skin material by a suitable cramping force between flame 4 and female mold 3, and thereafter resin melt 11 is supplied between the skin material and male mold 2 while keeping the male and female molds in an unclosed state (FIG. 2).

In the step for holding the skin material by the flame and the female mold, flame 5 is lowered by shrinkage of stretching mechanism 5. The resin melt is supplied through a passage for the resin melt (not shown) which is provided in the male mold.

4) A lifting mechanism (not shown) of the mold is again actuated to lower female mold 3 and flame 4. Thereby, resin melt 11 flows and presses skin material 10 against female mold 3 so that the skin material is drawn in the cavity of the female mold while the periphery of the skin material slides between flame 4 and female mold 3 and the skin material is expanded.

5) After female mold 3 is further lowered, they are completely closed so that the skin material and thermoplastic resin 13 are integrated together and the molding is finished.

6) After cooling, female mold 3 is lifted, and multilayer molded article 14 comprising integrated skin material 10 and thermoplastic resin 13 is removed from the mold.

The above molding process is one of the preferred embodiments of the process of the present invention and does not limit the process conditions such as the wetting method of the skin material, presence or absence of preheating of the skin material and premolding, positions of the male and female molds, presence or absence of the flame for supporting the skin material, methods and timing for supplying the resin melt and a mold structure for treating the edge part.

PREFERRED EMBODIMENTS OF THE INVENTION

Example 1

By using a mold for producing a box type molded article of 300×250×40 mm (thickness of 3 mm, a corner of 5 R), moquette (M-6-K 11858 (polyester type) manufactured by Kawashima Orimono) as a skin material and polypropylene (Sumitomo Noblen AZ-564 manufactured by Sumitomo Chemical Co., Ltd.) as a thermoplastic resin, a multilayer molded article was produced according to the method described above in which the moquette was wetted with water. The molded article had no breakage or wrinkle of the skin material and no oozing out of the resin, and the skin material had feeling of Grade 6 in a 10 grade evaluation of feeling in which Grade 10 corresponds to the feeling before molding and change of feeling is evaluated by ten grades. Grade 6 is the practically acceptable lowest grade.

Example 2

In the same manner as in Example 1 but using a cationic surfactant (Soflan S manufactured by Lion Corporation) diluted to 7/1000 with water in place of water, a multilayer molded article was produced. The molded article had no breakage or wrinkle of the skin material and no oozing out of the resin, and the skin material had feeling of Grade 8.

COMPARATIVE EXAMPLE 1

In the same manner as in Example 1 without wetting the moquette, a multilayer molded article was produced. The resin was oozed out from the corners of the article, and the feeling was Grade 4, which is not suitable for practical use.

Example 3

In the same manner as in Example 2 but using nonwoven polypropylene fabric (MRC 260 having an average weight (METSUKE) of 260 g/m$^2$ manufactured by Japan Vilene Co., Ltd.) as the skin material, a multilayer molded article was produced. The molded article had no breakage or wrinkle of the skin material and no oozing out of the resin, and the skin material had feeling of Grade 9.

COMPARATIVE EXAMPLE 2

In the same manner as in Example 3 without wetting the nonwoven fabric, a multilayer molded article was produced. The molded article had no wrinkle of the skin material and the skin material had feeling of Grade 6. But, the skin material was broken at the corners of the article, and the article was twisted and could not be practically used.

Example 4

In the same manner as in Example 1 but using a laminate material of tricot (T-6-00525 manufactured by Kawashima Orimono) and a polypropylene foam sheet (Peku 150030 manufactured by Toray Industries, Inc.) as a skin material and wetting the skin material with ethanol, a multilayer molded article was produced. The molded article had no breakage or wrinkle of the skin material and no oozing out of the resin, and the skin material had feeling of Grade 9.

COMPARATIVE EXAMPLE 3

In the same manner as in Example 4 without wetting the skin material, a multilayer molded article was produced. The molded article had no wrinkle of the skin material and the skin material had feeling of Grade 8. But, the skin material was broken at the corners of the article so that the article could not be practically used.

Example 5

By using a mold for producing a box type molded article of 300×250×40 mm (thickness of 3 mm, a corner of 5 R), a crimped leather sheet made of polyvinyl chloride (having a laminated foundation cloth) as a skin material and polypropylene (Sumitomo Noblen AZ-564 manufactured by Sumitomo Chemical Co., Ltd.) as a thermoplastic resin, a multilayer molded article was produced according to the method described above in which a surface of the skin material was wetted with water. The molded article had no breakage, wrinkle or discoloration of the skin material, and no oozing out of the resin, and the skin material had feeling of Grade 6.

COMPARATIVE EXAMPLE 4

In the same manner as in Example 5 without wetting the skin material, a multilayer molded article was produced. The skin material was broken at the corners of the article and discolored. The feeling was Grade 4. Thus, the molded article could not be practically used.

Example 6

In the same manner as in Example 5 but using a laminated material of the crimped leather sheet made of polyvinyl chloride and a polypropylene foam sheet (Peku 200030 manufactured by Toray Industries, Inc.) as a skin material and wetting the both surfaces of the skin material with water, a multilayer molded article was produced. The molded article had no breakage or wrinkle of the skin material and no oozing out of the resin, and the skin material had feeling of Grade 8.

COMPARATIVE EXAMPLE 5

In the same manner as in Example 6 without wetting the skin material, a multilayer molded article was produced. The molded article had no wrinkle of the skin material and the skin material had feeling of Grade 6. But, the article had unevenness which might be due to secondary foaming of the foam sheet. Further, the article was twisted and could not be practically used.

Example 7

In the same manner as in Example 5 but using a laminate material of the crimped leather sheet made of polyvinyl chloride and a polyurethane foam sheet having an expansion ratio of 30 as a skin material and wetting the skin material with ethanol, a multilayer molded article was produced. The molded article had no breakage or wrinkle of the skin material, and the skin material had feeling of Grade 9. The recovery ratio of the foam sheet (a ratio of the thickness of the foam sheet after molding to the original thickness of the foam sheet) was 85%.

COMPARATIVE EXAMPLE 6

In the same manner as in Example 7 without wetting the skin material, a multilayer molded article was produced. The molded article had no wrinkle of the skin material, and the skin material had feeling of Grade 8. But, the recovery ratio of the foam sheet was 50%.

What is claimed is:

1. A process for producing a multilayer molded article which comprises:
   wetting a skin material comprising a fabric or a thermoplastic resin sheet as an outermost layer with at least one liquid material,
   which is a volatile material and which is a liquid at room temperature and atmospheric pressure, state and a solution having a surfactant contained therein comprising a volatile material which is liquid in an ordinary state as a medium,
   supplying the wet skin material between male and female molds,
   supplying a thermoplastic resin melt between the molds and
   closing the molds to shape the thermoplastic resin melt against the wet skin material and thereby form the multilayer molded article comprising the integrally adhered skin material and the thermoplastic resin, wetting, of the skin material including wetting of the outermost layer to the extent that increase of the temperature of the skin material and excess penetration of the skin material are prevented during shaping of the thermoplastic melt, thereby preventing deterioration of the feeling and warping of the molded article.

2. The process according to claim 1, wherein the outermost layer of the skin material comprises a fabric and is wetted with an aqueous solution having a surfactant contained therein.

3. The process according to claim 2, wherein the surfactant is a cationic surfactant.

4. The process according to claim 2, wherein the surfactant is a tertiary amine.

5. The process according to claim 1, wherein the liquid material is water.

6. The process according to claim 1, wherein the liquid material further comprises a surfactant.

* * * * *